US006690340B2

(12) United States Patent
Sakura et al.

(10) Patent No.: US 6,690,340 B2
(45) Date of Patent: Feb. 10, 2004

(54) LIGHT-EMITTING DIODE DRIVING CIRCUIT AND OPTICAL TRANSMISSION MODULE USING THE SAME

(75) Inventors: Shigeyuki Sakura, Kawasaki (JP); Katsuji Kaminishi, Sendai (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 235 days.

(21) Appl. No.: 09/960,813

(22) Filed: Sep. 21, 2001

(65) Prior Publication Data

US 2002/0036630 A1 Mar. 28, 2002

(30) Foreign Application Priority Data

Sep. 26, 2000 (JP) ....................................... 2000-291909

(51) Int. Cl.[7] ............................ G09G 3/14; G09G 3/32; G09G 3/34

(52) U.S. Cl. .............................. 345/46; 345/82; 345/84

(58) Field of Search .............................. 345/46, 82–84, 345/101, 204; 315/112, 117, 169.1, 169.3, 224, 291, 309; 327/109, 514, 515, 108; 372/38.02, 38.03, 38.07; 250/551, 552; 340/815.45

(56) References Cited

U.S. PATENT DOCUMENTS 5,880,610 A * 3/1999 Nishizono et al. .......... 327/103
6,127,784 A * 10/2000 Grossman et al. .......... 315/159
6,144,222 A * 11/2000 Ho .............................. 326/82
6,220,764 B1 * 4/2001 Kato et al. .................... 385/92
6,318,908 B1 * 11/2001 Nakanishi et al. ............ 385/89
6,400,349 B1 * 6/2002 Nagumo ...................... 345/82
2002/0014862 A1 * 2/2002 Fregoso ...................... 315/291

FOREIGN PATENT DOCUMENTS

| | | |
|---|---|---|
| JP | 07-074788 | 3/1995 |
| JP | 11-017625 | 1/1999 |
| JP | 11-040855 | 2/1999 |
| JP | 11-103108 | 4/1999 |
| JP | 2000-022256 | 1/2000 |
| JP | 2001-015854 | 1/2001 |

OTHER PUBLICATIONS

U.S. patent application Ser. No. 09/858,757, Sakura et al., filed May 16, 2001.

* cited by examiner

*Primary Examiner*—Bipin Shalwala
*Assistant Examiner*—David L. Lewis
(74) *Attorney, Agent, or Firm*—Hogan & Hartson LLP

(57) ABSTRACT

A light-emitting diode driving circuit according to an embodiment of this invention includes a light-emitting diode, a first current switch circuit connected in series with the light-emitting diode, the first current switch circuit turning on/off a current in accordance with an external input signal input from an input terminal, a pulse current generating circuit connected in parallel with the first current switch circuit, the pulse current generating circuit supplying a pulse current including a pulse width smaller than the pulse width of the external input signal and shaping a leading edge portion of an optical waveform output from the light-emitting diode into a desired optical waveform, and a discharge circuit connected in parallel with the light-emitting diode, the discharge circuit quickly discharging charge stored in the light-emitting diode when the current to the first current switch circuit is turned off.

14 Claims, 2 Drawing Sheets

LIGHT-EMITTING DIODE DRIVING CIRCUIT AND OPTICAL TRANSMISSION MODULE USING THE SAME

CROSS-REFERENCE TO RELATED APPLICATIONS

This application is based upon and claims the benefit of priority from the prior Japanese Patent Application No. 2000-291909, filed Sep. 26, 2000, the entire contents of which are incorporated herein by reference.

BACKGROUND OF THE INVENTION

1. Field of the Invention

The present invention relates to a light-emitting diode (LED) driving circuit and an optical transmission module using the circuit and, more particularly, to a high-speed optical transmission module or an optical transmission module used in an optical transceiver.

2. Description of the Related Art

A conventional light-emitting diode (LED) driving circuit for obtaining a high-speed optical output waveform uses a circuit for shortening a fall time and is designed to perform peaking at a leading edge portion, as disclosed in Jpn. Pat. Appln. KOKAI Publication No. 7-74788 "High-Speed Optical Transmission Circuit".

FIG. 6 shows a conventional light-emitting diode driving circuit. As shown in FIG. 6, the inputs of a first current switch circuit 33, buffer amplifier 34, and inverter 35 are connected to an input terminal 32. One terminal of a first capacitor 36 is connected to the output of the buffer amplifier 34. A second current switch circuit 38 is connected to the other terminal of the first capacitor 36. One terminal of a second capacitor 37 is connected to the output of the inverter 35. A third current switch circuit 39 is connected to the other terminal of the second capacitor 37. A current mirror circuit 40 formed by a PNP transistor is connected to the third current switch circuit 39. An LED 1 is connected to the current mirror circuit 40. The first and second current switch circuits 33 and 38 are connected to the cathode of the LED 1. Note that a power supply potential Vcc is applied to the anode of the LED 1.

According to the above conventional driving circuit, a driving current to the LED 1 is turned on/off by the first current switch circuit 33, and a digital signal passing through the buffer amplifier 34 is differentiated by the first capacitor 36. The leading edge of this differentiated digital signal is converted into a current signal by a comparator+second current switch circuit 38 to be supplied to the LED 1. The digital signal inverted by the inverter 35 is also differentiated by the second capacitor 37. The trailing edge of this differentiated digital signal is converted into a pulse current signal by a comparator+third current switch circuit 39 to be supplied to the current mirror circuit 40. An output signal from this current mirror circuit 40 is then supplied to the cathode of the LED 1.

According to this arrangement, at the leading edge of the above output signal, the LED 1 is overdriven, whereas at the trailing edge of the output signal, the charge stored in the LED 1 is discharged. This makes it possible to drive the LED 1 at high speed.

The following three problems, however, arise in the above conventional driving circuit.

First, since a lateral type PNP transistor having a low cutoff frequency is often used as a PNP transistor that can be used in an IC, a high-speed pulse current cannot be supplied. Although a vertical type PNP transistor having a relatively high cutoff frequency may be formed, a high-speed pulse current cannot be supplied to this transistor as compared with an NPN transistor. In addition, since the parasitic capacitance between the collector and the substrate is large, a sufficiently high operation speed cannot be attained when the transistor is driven at 100 Mpbs or more. It is therefore difficult to implement sufficiently high-speed operation.

Second, since a pulse current is generated by a differential signal obtained by a capacitor, it is difficult to design the pulse width of a pulse current supplied to the LED to have a desired value. For this reason, it is difficult to match the pulse width of the pulse current generated by a differential signal to the pulse width of a pulse current for discharging the charge stored in the LED. It is therefore difficult to obtain a desired optical output waveform.

Third, the LED has a transition time capacitance component of about 100 to 200 pF as well as a general junction capacitance. This transition time capacitance component increases in proportion to a current that flows in the LED. For this reason, when a current is supplied to the LED, the current is used first to charge the LED with a transition time capacitance component. This produces a delay time of about 10 to 20 ns before the optical output reaches a desired value. At the trailing edge of the output signal, since the current ceases to flow with a slight drop in voltage, the delay time is shorter than that at the leading edge. Consequently, the pulse width of light becomes smaller than that of an input. That is, the conventional circuit structure is not suited to high-speed transmission.

BRIEF SUMMARY OF THE INVENTION

According to the first aspect of the present invention, there is provided a light-emitting diode driving circuit comprising a light-emitting diode, a first current switch circuit connected in series with the light-emitting diode, the first current switch circuit turning on/off a current in accordance with an external input signal input from an input terminal, a pulse current generating circuit connected in parallel with the first current switch circuit, the pulse current generating circuit supplying a pulse current including a pulse width smaller than a pulse width of the external input signal and shaping a leading edge portion of an optical waveform output from the light-emitting diode into a desired optical waveform, and a discharge circuit connected in parallel with the light-emitting diode, the discharge circuit quickly discharging charge stored in the light-emitting diode when the current to the first current switch circuit is turned off.

According to the second aspect of the present invention, there is provided an optical transmission module comprising a sub-module substrate or a lead frame, a light-emitting diode mounted on the sub-module substrate or the lead frame, an IC mounted on the sub-module substrate or the lead frame and including a light-emitting diode driving circuit for driving the light-emitting diode, an optical connector optically coupled to the light-emitting diode, a lead electrically coupled to the IC or the light-emitting diode, and a package for housing the sub-module substrate or the lead frame, the optical connector, and the lead. The light-emitting diode driving circuit comprises a first current switch circuit connected in series with the light-emitting diode, the first current switch circuit turning on/off a current in accordance with an external input signal input from an input terminal, a pulse current generating circuit connected in parallel with the first current switch circuit, the pulse current generating circuit supplying a pulse current including a pulse width smaller than a pulse width of the external input signal and shaping a leading edge portion of an optical waveform output from the light-emitting diode into a desired optical waveform, and a discharge circuit connected in parallel with the light-emitting diode, the discharge circuit quickly discharging charge stored in the light-emitting diode when the current to the first current switch circuit is turned off.

DETAILED DESCRIPTION OF THE INVENTION

Embodiments of the present invention will be described below with reference to the views of the accompanying drawing.

First Embodiment

Figure 1:
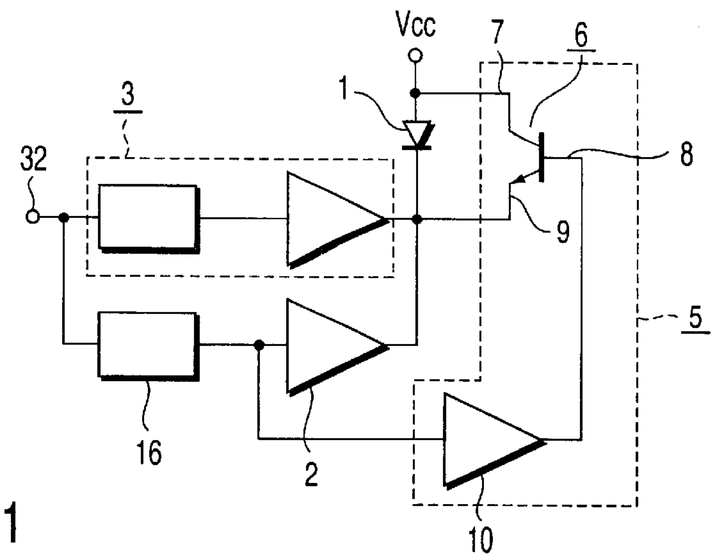
FIG. 1 is a circuit diagram showing the arrangement of a light-emitting diode driving circuit according to the first embodiment of the present invention.

FIG. 1 shows a light-emitting diode driving circuit according to the first embodiment of the present invention. Referring to FIG. 1, the inputs of a pulse current generating circuit 3 and pulse shaping circuit 16 are connected to an input terminal 32. The inputs of a first current switch circuit 2 and discharge circuit 5 are connected to the output of the pulse shaping circuit 16. The anode and cathode of an LED 1 are connected to the output of the discharge circuit 5. The outputs of the pulse current generating circuit 3 and first current switch circuit 2 are connected to the cathode of the LED 1.

In this manner, the first current switch circuit 2 is connected in series with the LED 1, and the discharge circuit 5 is connected in parallel with the LED 1. The pulse current generating circuit 3 is connected in parallel with the first current switch circuit 2.

A power supply potential Vcc is applied to the anode of the LED 1. The first current switch circuit 2 turns on/off a current in accordance with an external input signal input from the input terminal 32.

The discharge circuit 5 has the function of quickly discharging the charge stored in the LED 1 when the current to the first current switch circuit 2 is turned off. The discharge circuit 5 is comprised of a voltage switch circuit 10 connected to the output of a pulse shaping circuit 16 and a transistor 6 connected to the voltage switch circuit 10. In this case, the transistor 6 has its base 8 connected to the output of the voltage switch circuit 10, its collector 7 connected to the anode of the LED 1, and its emitter 9 connected to the cathode of the LED 1.

An output voltage Von from the first current switch circuit 2 is set to allow no current to flow in the transistor 6 when the first current switch circuit 2 is turned on. An output voltage Voff from the first current switch circuit 2 is set to allow the charge stored in the junction of the LED 1 to be discharged through the transistor 6 when the first current switch circuit 2 is turned off.

With this arrangement, at the trailing edge of an input signal, the charge stored in the LED 1 can be quickly discharged, thus obtaining a high-speed trailing edge waveform.

Figure 2:
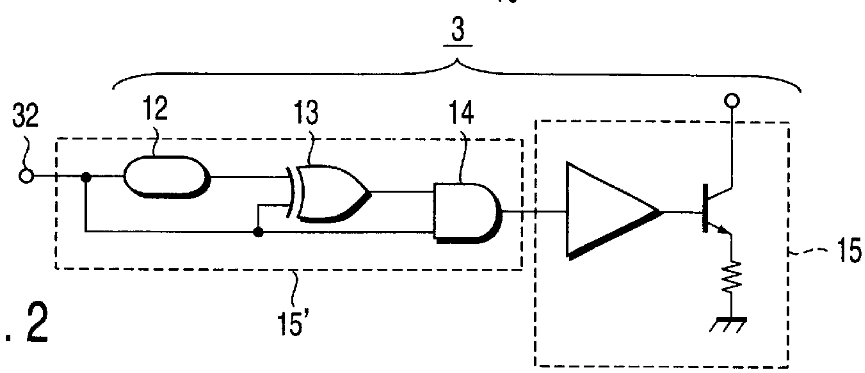
FIG. 2 is a circuit diagram showing the arrangement of a pulse current generating circuit according to the first embodiment of the present invention.

FIG. 2 shows the circuit arrangement of the pulse current generating circuit 3. The pulse current generating circuit 3 has the function of supplying a pulse current having a pulse width smaller than that of an external input signal so as to make the leading edge portion of an optical waveform output from the LED 1 have a desired optical waveform.

As shown in FIG. 2, the pulse current generating circuit 3 is comprised of a leading edge detection circuit 15' and a second current switch circuit 15 connected to the output of the leading edge detection circuit 15'.

In this case, the leading edge detection circuit 15' is comprised of a first delay circuit 12, exclusive OR circuit (to be referred to as an EXOR circuit hereinafter) 13, and AND circuit 14. The first delay circuit 12 is used to delay the external input signal input from the input terminal 32. The EXOR circuit 13 has one input connected to the output of the first delay circuit 12, and the other input connected to the input terminal 32. The AND circuit 14 has one input connected to the output of the EXOR circuit 13, and the other input connected to the input terminal 32.

The second current switch circuit 15 has the function of holding the pulse width of a signal input from the leading edge detection circuit 15' and at the same time variably setting a peak current value.

With this arrangement, a pulse signal having a delay time length determined by the first delay circuit 12, which corresponds the leading edge portion and trailing edge portion of an input signal, is obtained at the output of the EXOR circuit 13. By ANDing this pulse signal and the input signal, a pulse signal corresponding to the leading edge portion of the input signal is obtained at the output of the AND circuit 14. A leading edge pulse current is then generated from the second current switch circuit 15 by this pulse signal. By supplying the leading edge pulse current whose pulse width and peak current value are controlled in this manner to the LED 1, the rise time of the LED 1 can be shortened, and the corresponding waveform can be made similar to a rectangular pulse.

Figure 3:
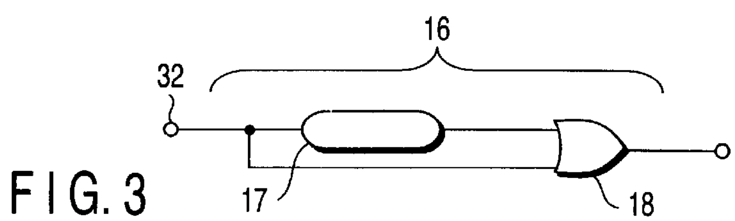
FIG. 3 is a circuit diagram showing the arrangement of a pulse shaping circuit according to the first embodiment of the present invention.

FIG. 3 shows the circuit arrangement of the pulse shaping circuit 16. As shown in FIG. 3, the pulse shaping circuit 16 is comprised of a second delay circuit 17 and OR circuit 18.

In this case, the second delay circuit 17 delays the external input signal input from the input terminal 32. The OR circuit 18 has one input connected to the output of the second delay circuit 17, and the other input connected to the input terminal 32.

With this arrangement, the external input signal input from the input terminal 32 is directly input to the OR circuit 18 and also input to the second delay circuit 17. By ORing the delay signal delayed by the second delay circuit 17 and external input signal, a pulse signal having a large pulse width can be generated by the OR circuit 18. The pulse width of this pulse signal can be increased by the delay time in the second delay circuit 17 when the signal is input to the input terminal 32. When an output current from the first current switch circuit 2 is turned on/off by this pulse signal with the large pulse width, an optical output from the LED 1 is turned on/off.

As described above, the pulse shaping circuit 16 can increase the pulse width of an external input signal to a predetermined width. By adjusting the waveform of an optical output using the pulse shaping circuit 16, a decrease in the pulse width of the optical output can be prevented. This makes it possible to match the pulse width of an input to the pulse width of an optical output, thus realizing high-speed operation.

According to the first embodiment, the discharge circuit 5 is formed by the voltage switch circuit 10 and transistor 6, and the voltage switch circuit 10 of the discharge circuit 5 is set to a predetermined output voltage. With this setting, the charge stored in the LED 1 can be quickly discharged to obtain a high-speed trailing edge waveform. Therefore, high-speed operation can be realized without using any PNP transistor.

In addition, the pulse current generating circuit 3 is formed by the leading edge detection circuit 15' and second current switch circuit 15. With this pulse current generating circuit 3, a leading edge pulse current whose pulse width and peak current values are controlled can be generated. By supplying this leading edge pulse current to the LED 1, the rise time of the LED 1 can be shortened, thus realizing high-speed operation. In addition, by using the pulse current generating circuit 3, a pulse current can be generated without generating any pulse current using a differential signal. Therefore, a desired optical output waveform can be obtained.

Furthermore, the pulse shaping circuit 16 is formed by the second delay circuit 17 and OR circuit 18. By adjusting the waveform of an optical output using this pulse shaping circuit 16, a decrease in optical pulse width due to the characteristics of the LED 1 can be suppressed. As a consequence, an optical output having an accurate pulse width equal to that of an input pulse can be generated, and high-speed operation can be realized.

Note that in a time region in which no leading edge pulse current is generated, the output current from the pulse current generating circuit 3 may be set to output a steady current smaller than a current value switched by the first current switch circuit 2. More specifically, for example, the low-level voltage applied to the base of the transistor in the second current switch circuit 15 is controlled or another steady current power supply is connected to the output of the second current switch circuit 15. By supplying a steady current by such a method, correction of a pulse width adjusted by the pulse shaping circuit 16 can be reduced, and hence variations in pulse width distortion due to element variations can be reduced, in addition to the effect in the first embodiment.

In addition, the light-emitting diode driving circuit according to the first embodiment may further include a temperature compensation circuit capable of controlling the output voltage Von/Voff from the voltage switch circuit 10 to follow variations in voltage drop when the operating temperature of the LED 1 changes and the voltage drops in the forward direction. In this case, in addition to the effect in the first embodiment, the effect of reducing a change in the fall time of an optical output with a change in temperature can be obtained because the output voltage Von/Voff from the voltage switch circuit 10 can be controlled by the temperature compensation circuit when the operating temperature of the LED 1 changes and the voltage drops in the forward direction.

Second Embodiment

In the second embodiment, the transistor 6 of the discharge circuit 5 in the first embodiment is replaced with a MIS transistor such as a MOS transistor.

Figure 4:
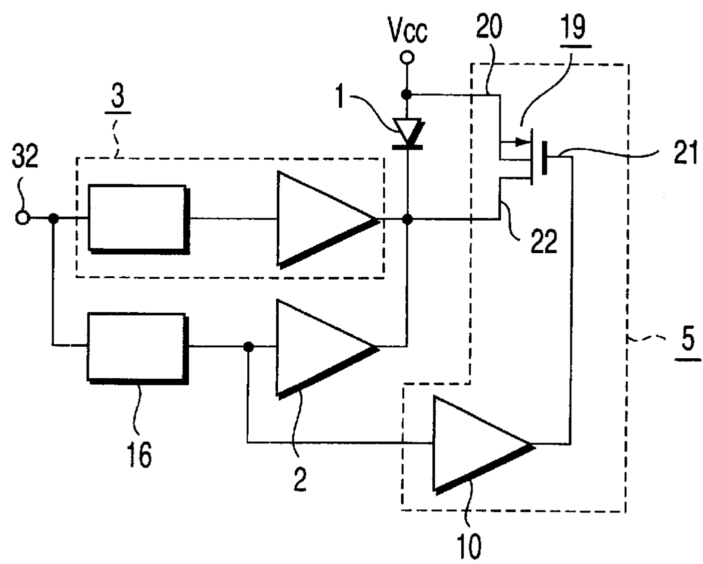
FIG. 4 is a circuit diagram showing the arrangement of a light-emitting diode driving circuit according to the second embodiment of the present invention.

FIG. 4 shows a light-emitting diode driving circuit according to the second embodiment of the present invention. The second embodiment differs from the first embodiment in the arrangement of a discharge circuit 5. A description of the structure of the second embodiment which is similar to that of the first embodiment will be omitted.

As shown in FIG. 4, the discharge circuit 5 according to the second embodiment is comprised of a voltage switch circuit 10 connected to the output of a pulse shaping circuit 16 and a P-channel MOS transistor 19 connected to the voltage switch circuit 10.

The MOS transistor 19 has its gate 21 connected to the output of the voltage switch circuit 10, its source 20 connected to the anode or cathode of an LED 1, and its drain 22 connected to the cathode or anode of the LED 1.

With this arrangement, the charge stored in the LED 1 can be quickly discharged by turning on the MOS transistor 19 when a driving current to the LED 1 is turned off. This makes it possible to shorten the fall time.

According to the second embodiment, the same effects as those of the first embodiment can be obtained.

In addition, the fall time can be shortened more in this driving circuit than in the driving circuit in the first embodiment.

Note that the potential of the source 20 of the MOS transistor 19 may be slightly lower than the potential of a power supply voltage Vcc. In this case, the effect of shortening the fall time can be obtained as well as the same effects as those of the second embodiment.

Third Embodiment

The third embodiment exemplifies an optical transmission module using the LED driving circuit according to the first or second embodiment.

Figure 5:
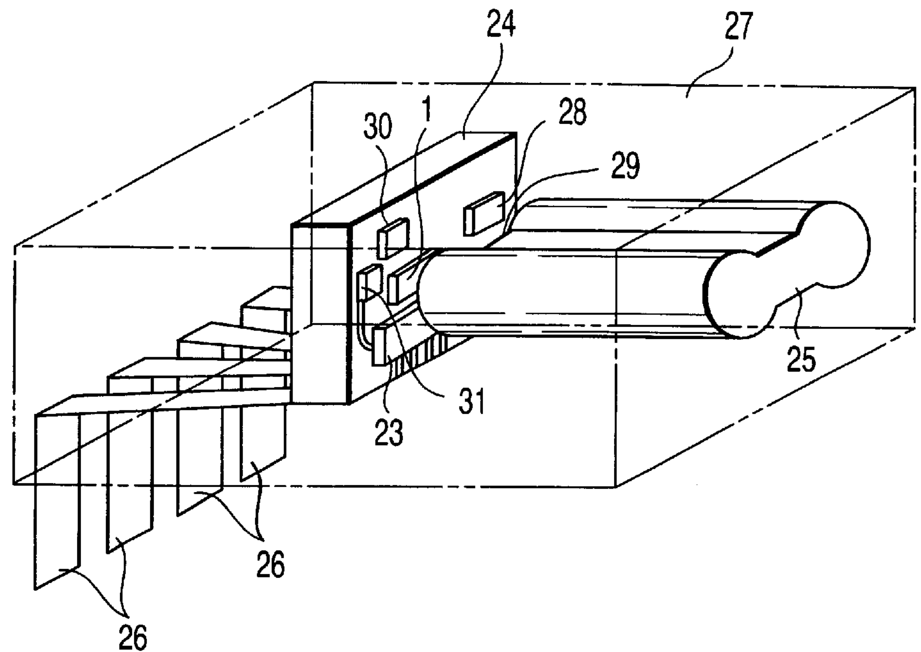
FIG. 5 is a perspective view of an optical transmission module using the light-emitting diode driving circuit according to the third embodiment of the present invention.
Figure 6:
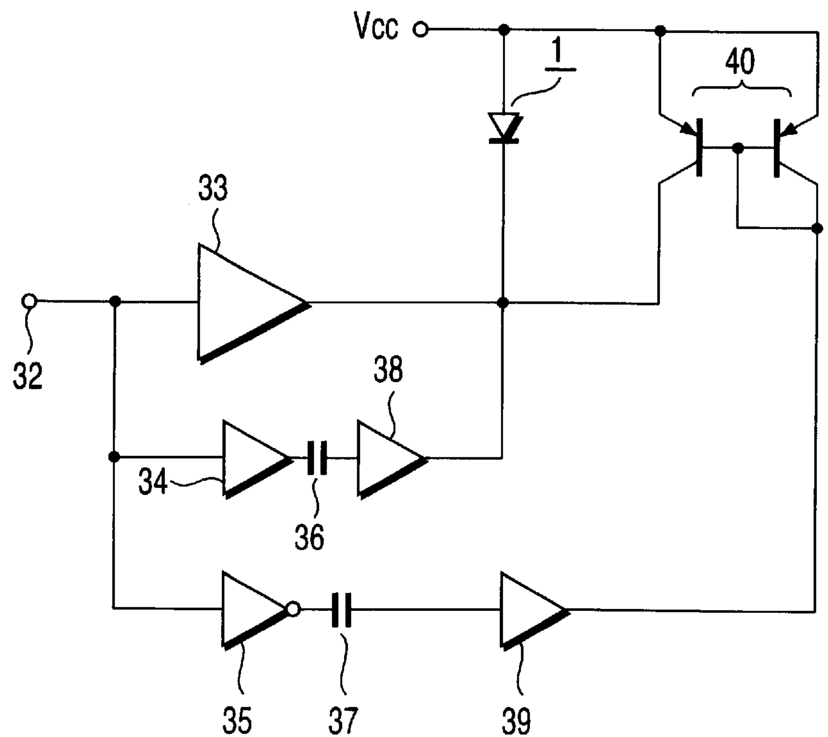
FIG. 6 is a circuit diagram showing the arrangement of a conventional light-emitting diode driving circuit.

FIG. 5 is a perspective view of an optical transmission module according to the third embodiment of the present invention. AS shown in FIG. 5, an IC 23 incorporating the LED driving circuit according to the first or second embodiment, an LED 1 connected to the IC 23, and a module constituted by a capacitor 31 and resistor 30 which serve upon operation of the IC 23 are mounted altogether on a sub-module substrate 24. An integrally molded optical connector 25 is optically coupled to the LED 1. An optical waveguide (not shown) such as a plastic fiber is optically coupled to the optical connector 25. Leads 26 are electrically coupled to one side end of the module (IC 23 or LED 1). An external terminal (not shown) is electrically coupled to each lead 26. The sub-module substrate 24, the optical connector 25, and parts of the leads 26 are molded together and are housed in a plastic package 27.

Note that a lead frame for plastic molding may be used in place of the sub-module substrate 24.

Although the leads 26 are arranged on only one side end of the module, positions where the leads 26 are formed can be properly selected. For example, they may be arranged on the other side end of the package 27. In addition, leads may be used to ensure high mechanical strength in mounting a module on a printed board.

A reception module can be mounted beside a transmission module to form an integrally molded transceiver module without departing from the gist of the present invention. For example, as shown in FIG. 5, a photodetector 28 and reception IC 29 as components of a reception module may be mounted on the sub-module substrate 24.

According to the third embodiment described above, by using the LED driving circuit according to the first or second embodiment, an optical output waveform with an accurate pulse width and short rise and fall times can be obtained. For this reason, high-speed modulation can be performed even with respect to an LED essentially having a large junction capacitance. In addition, since the pulse waveform distorts little, an optical transmission module that can cope with a low-voltage power supply with small power consumption can be realized.

Furthermore, a low-power-consumption, compact, optical connector coupling type plastic transmission module or optical reception module can be realized, which operates with a single power supply and can be used with a standard heat dissipation design.

Moreover, by using an LED as a light-emitting element instead of a laser diode, a long-life optical transmission module which remains stable with a change in temperature can be formed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light-emitting diode driving circuit comprising:

a light-emitting diode;

a first current switch circuit connected in series with said light-emitting diode, said first current switch circuit turning on/off a current in accordance with an external input signal input from an input terminal;

a pulse current generating circuit connected in parallel with said first current switch circuit, said pulse current generating circuit supplying a pulse current including a pulse width smaller than a pulse width of the external input signal and shaping a leading edge portion of an optical waveform output from said light-emitting diode into a desired optical waveform; and a discharge circuit connected in parallel with said light-emitting diode, said discharge circuit quickly discharging charge stored in said light-emitting diode when the current to said first current switch circuit is turned off, wherein said discharge circuit comprises:

a transistor including a collector, an emitter, and a base, the collector being connected to an anode of said light-emitting diode, and the emitter being connected to a cathode of said light-emitting diode; and a voltage switch circuit connected to the base of said transistor, said voltage switch circuit including a voltage Von set during an ON period of said first current switch circuit to inhibit a current from flowing in said transistor, and said voltage switch circuit including a voltage Voff set during an OFF period of said first current switch circuit to discharge charge stored in a junction of said light-emitting diode.

2. A light-emitting diode driving circuit comprising:

a light-emitting diode; a first current switch circuit connected in series with said light-emitting diode, said first current switch circuit turning on/off a current in accordance with an external input signal input from an input terminal;

a pulse current generating circuit connected in parallel with said first current switch circuit, said pulse current generating circuit supplying a pulse current including a pulse width smaller than a pulse width of the external input signal and shaping a leading edge portion of an optical waveform output from said light-emitting diode into a desired optical waveform; and a discharge circuit connected in parallel with said light-emitting diode, said discharge circuit quickly discharging charge stored in said light-emitting diode when the current to said first current switch circuit is turned off, wherein said pulse current generating circuit comprises:

a leading edge detection circuit including a first delay circuit, an EXOR circuit, and an AND circuit, the first delay circuit delaying the external input signal, the EXOR circuit including one input connected to an output of the first delay circuit, and the other input connected to said input terminal, and the AND circuit including one input connected to an output of the EXOR circuit, and other input connected to said input terminal; and a second current switch circuit which is connected to an output of said leading edge detection circuit and generates a leading edge pulse current.

3. The circuit according to claim 2, wherein said pulse current generating circuit outputs a steady current including a value smaller than a current value switched by said first current switch circuit in a time region in which the leading edge pulse current is not generated.

4. A light-emitting diode driving circuit comprising:

a light-emitting diode;

a first current switch circuit connected in series with said light-emitting diode, said first current switch circuit turning on/off a current in accordance with an external input signal input from an input terminal;

a pulse current generating circuit connected in parallel with said first current switch circuit, said pulse current generating circuit supplying a pulse current including a pulse width smaller than a pulse width of the external input signal and shaping a leading edge portion of an optical waveform output from said light-emitting diode into a desired optical waveform;

a discharge circuit connected in parallel with said light-emitting diode, said discharge circuit quickly discharging charge stored in said light-emitting diode when the current to said first current switch circuit is turned off; and a pulse shaping circuit which is placed between the input terminal and said first current switch circuit and increases the pulse width of the external input signal to a predetermined width.

5. The circuit according to claim 4, wherein said pulse shaping circuit comprises:

a second delay circuit for delaying the external input signal; and an OR circuit including one input connected to an output of said second delay circuit, and the other input connected to the external input signal.

6. The circuit according to claim 1, which further comprising a temperature compensation circuit which follows, when an operating temperature of said light-emitting diode changes and a voltage drop in a forward direction changes, a charge of the voltage drop by controlling the voltage Von/Voff of said voltage switch circuit.

7. The circuit according to claim 1, wherein the transistor comprises a MIS transistor including a gate, a source, and a drain, and the gate is connected to an output of the voltage switch circuit, the source is connected to an anode or cathode of said light-emitting diode, and the drain is connected to the cathode or anode of said light-emitting diode.

8. An optical transmission module comprising:

a sub-module substrate or a lead frame;

a light-emitting diode mounted on said sub-module substrate or said lead frame;

an IC mounted on said sub-module substrate or said lead frame and including a light-emitting diode driving circuit for driving said light-emitting diode:

an optical connector optically coupled to said light-emitting diode;

a lead electrically coupled to said IC or said light-emitting diode; and a package for housing said sub-module substrate or said lead frame, said optical connector, and said lead, said light-emitting diode driving circuit comprising:

a first current switch circuit connected in series with said light-emitting diode, said first current switch circuit turning on/off a current in accordance with an external input signal input from an input terminal;

a pulse current generating circuit connected in parallel with said first current switch circuit, said pulse current generating circuit supplying a pulse current including a pulse width smaller than a pulse width of the external input signal and shaping a leading edge portion of an optical waveform output from said light-emitting diode into a desired optical waveform; and a discharge circuit connected in parallel with said light-emitting diode, said discharge circuit quickly discharging charge stored in said light-emitting diode when the current to said first current switch circuit is turned off, wherein said discharge circuit comprises:

a transistor including a collector, an emitter, and a base, the collector being connected to an anode of said light-emitting diode, and the emitter being connected to a cathode of said light-emitting diode; and a voltage switch circuit connected to the base of said transistor, said voltage switch circuit including a voltage Von set during an ON period of said first current switch circuit to inhibit a current from flowing in said transistor, and said voltage switch circuit including a voltage Voff set during an OFF period of said first current switch circuit to discharge charge stored in a junction of said light-emitting diode.

9. An optical transmission module comprising:

a sub-module substrate or a lead frame;

a light-emitting diode mounted on said sub-module substrate or said lead frame;

an IC mounted on said sub-module substrate or said lead frame and including a light-emitting diode driving circuit for driving said light-emitting diode;

an optical connector optically coupled to said light-emitting diode;

a lead electrically coupled to said IC or said light-emitting diode; and a package for housing said sub-module substrate or said lead frame, said optical connector, and said lead, said light-emitting diode driving circuit comprising:

a first current switch circuit connected in series with said light-emitting diode, said first current switch circuit turning on/off a current in accordance with an external input signal input from an input terminal;

a pulse current generating circuit connected in parallel with said first current switch circuit, said pulse current generating circuit supplying a pulse current including a pulse width smaller than a pulse width of the external input signal and shaping a leading edge portion of an optical waveform output from said light-emitting diode into a desired optical waveform; and a discharge circuit connected in parallel with said light-emitting diode, said discharge circuit quickly discharging charge stored in said light-emitting diode when the current to said first current switch circuit is turned off, wherein said pulse current generating circuit comprises:

a leading edge detection circuit including a first delay circuit, an EXOR circuit, and an AND circuit, the first delay circuit delaying the external input signal, the EXOR circuit including one input connected to an output of the first delay circuit, and the other input connected to said input terminal, and the AND circuit including one input connected to an output of the EXOR circuit, and other input connected to said input terminal; and a second current switch circuit which is connected to an output of said leading edge detection circuit and generates a leading edge pulse current.

10. The module according to claim 9, wherein said pulse current generating circuit outputs a steady current including a value smaller than a current value switched by said first current switch circuit in a time region in which the leading edge pulse current is not generated.

11. An optical transmission module comprising:

a sub-module substrate or a lead frame;

a light-emitting diode mounted on said sub-module substrate or said lead frame;

an IC mounted on said sub-module substrate or said lead frame and including a light-emitting diode driving circuit for driving said light-emitting diode;

an optical connector optically coupled to said light-emitting diode;

a lead electrically coupled to said IC or said light-emitting diode; and a package for housing said sub-module substrate or said lead frame, said optical connector, and said lead, said light-emitting diode driving circuit comprising:

a first current switch circuit connected in series with said light-emitting diode, said first current switch circuit turning on/off a current in accordance with an external input signal input from an input terminal;

a pulse current generating circuit connected in parallel with said first current switch circuit, said pulse current generating circuit supplying a pulse current including a pulse width smaller than a pulse width of the external input signal and shaping a leading edge portion of an optical waveform output from said light-emitting diode into a desired optical waveform;

a discharge circuit connected in parallel with said light-emitting diode, said discharge circuit quickly discharging charge stored in said light-emitting diode when the current to said first current switch circuit is turned off; and a pulse shaping circuit which is placed between the input terminal and said first current switch circuit and increases the pulse width of the external input signaled to a predetermined width.

12. The module according to claim 11, wherein said pulse shaping circuit comprises:

a second delay circuit for delaying the external input signal; and an OR circuit including one input connected to an output of said second delay circuit, and the other input connected to the external input signal.

13. The module according to claim 8, which further comprising a temperature compensation circuit which follows, when an operating temperature of said light-emitting diode changes and a voltage drop in a forward direction changes, a charge of the voltage drop by controlling the voltage Von/Voff of said voltage switch circuit.

14. A module according to claim 8, wherein the transistor comprises a MIS transistor including a gate, a source, and a drain, and the gate is connected to an output of the voltage switch circuit, the source is connected to an anode or cathode of said light-emitting diode, and the drain is connected to the cathode or anode of said light-emitting diode.

* * * * *